(No Model.)
A. S. ROUSH & A. C. HALTERMAN.
PLANT BED HEATER.
No. 333,085. Patented Dec. 22, 1885.
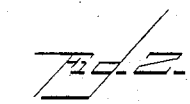
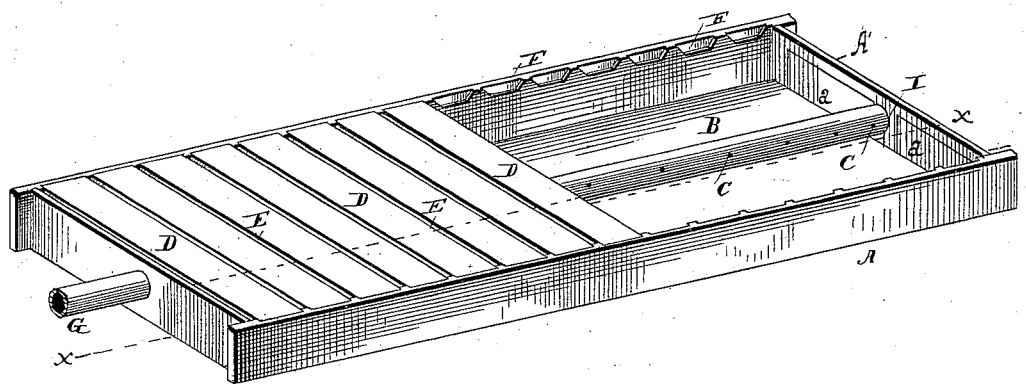
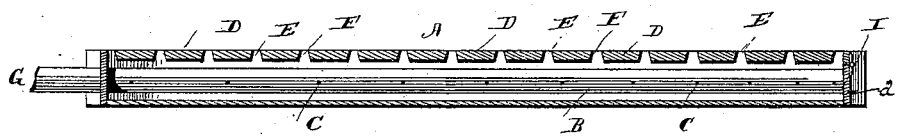
WITNESSES
F. L. Ourand
E. M. Johnson
Allen S. Roush
and
Andrew C. Halterman
by
INVENTORS
George E. Lemon
Attorney

UNITED STATES PATENT OFFICE.

ALLEN S. ROUSH AND ANDREW C. HALTERMAN, OF NEW HAVEN, W. VA.

PLANT-BED HEATER.

SPECIFICATION forming part of Letters Patent No. 333,085, dated December 22, 1885.

Application filed June 1, 1885. Serial No. 167,339. (No model.)

*To all whom it may concern:*

Be it known that we, ALLEN S. ROUSH and ANDREW C. HALTERMAN, both citizens of the United States of America, residing at New Haven, in the county of Mason and State of West Virginia, have jointly invented a new and useful Improvement in Plant-Bed Heaters; and we do hereby declare the following to be a full, clear, and exact description of the invention, such as will enable others skilled in the art to which it appertains to make and use the same.

Our invention has reference to plant-bed heaters; and it consists in the improvements hereinafter described and set forth.

In the accompanying drawings, forming part of this specification, Figure 1 is a perspective view of a plant-bed heater constructed in accordance with our invention, portions of the heater being removed, to more clearly illustrate the internal arrangement of the device; and Fig. 2 is a longitudinal section on the dotted line *x x*, Fig. 1.

A is a shallow rectangular receptacle, provided with bottom and sides and open at its top. One of its ends, A', is provided with apertures, which are tightly closed by means of hinged doors *a*.

B is a pipe, which centrally pierces the end sections of the receptacle and extends centrally through said receptacle. One end, G, of said pipe projects sufficiently from the receptacle to admit of its attachment to a steam-generator, while the other end, I, of said pipe is closed. The said pipe within the receptacle is provided with a series of perforations, C, the distance or intervals between which gradually decrease in the direction of the end I. The upper edge of each side of the receptacle A is provided with a series of depressions, F, each of which is contracted toward its bottom and registers transversely with a similar depression on the side opposite. Within these depressions are adapted to rest a series of transverse bars, D, each of which is of tapering form, to enable it to rest snugly in position. The said bars are so arranged relative to each other as to leave a slight space between their adjacent edges.

In use a little straw or other suitable material is placed upon the bars D, to prevent the earth from sifting through to the interior of the receptacle A, and the desired amount of earth to form the bed is then placed upon the straw. The steam is then supplied to the pipe B, and, escaping through the apertures C, warms and moistens the earth above. As the temperature of the steam will gradually become decreased as it passes from each succeeding aperture C, the decreased distance between said aperture in the direction of the end I will enable an increased amount of steam to be supplied to each succeeding area than was supplied to its preceding one. This arrangement thereby maintains the temperature equally along the length of the pipe B.

The doors *a* may be readily opened, to enable access to the interior of the receptacle for cleaning purposes.

We claim—

The combination, in a plant-bed heater, of a receptacle having a tight bottom, doors hinged over apertures in one end, the upper edges of the sides being recessed and having bars fitted in said recesses, leaving slight spaces between each other to form a top for the support of the plant-bed, and a pipe extending into said receptacle, provided with a series of perforations increasing in number in the direction of the steam-travel, substantially as set forth.

ALLEN S. ROUSH.
ANDREW C. HALTERMAN.

Witnesses:
FRANCIS A. MARTIN,
TAYLOR BUMGARNER.